E. D. TILLYER.
MIRROR.
APPLICATION FILED JAN. 2, 1918.
1,278,521.
Patented Sept. 10, 1918.
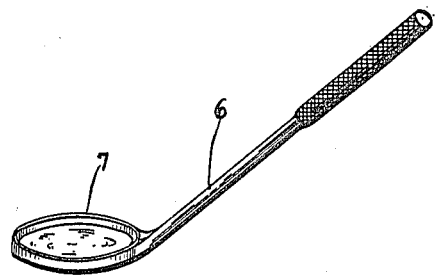
FIG. I
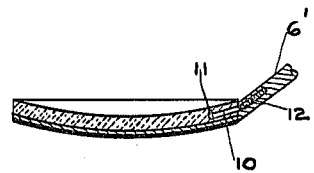
FIG. IV
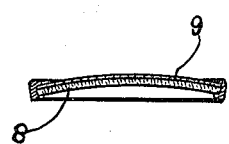
FIG. II
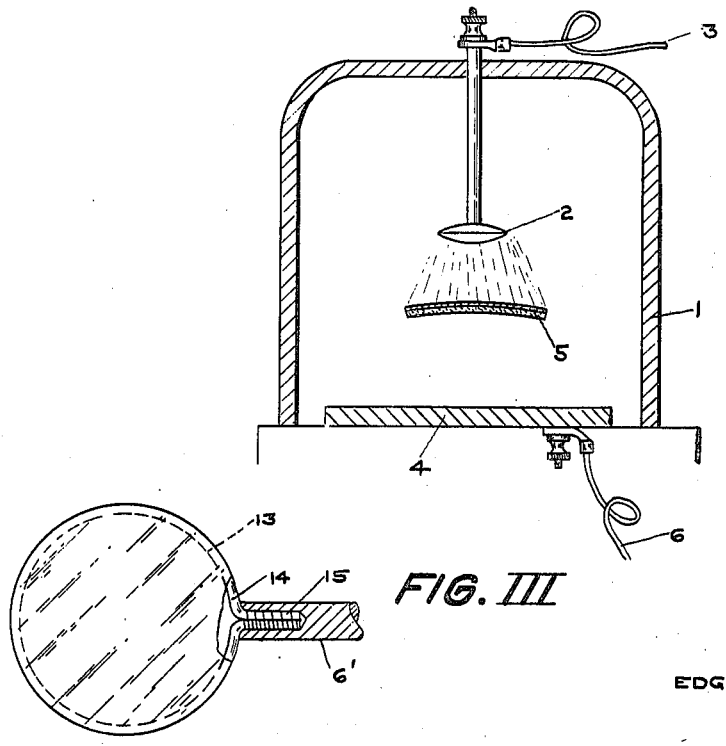
FIG. III
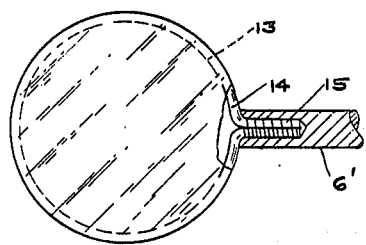
FIG. V
INVENTOR
EDGAR D. TILLYER
BY
H. H. Styll  H. H. Parsons
ATTORNEYS

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

MIRROR.

1,278,521.  Specification of Letters Patent.  Patented Sept. 10, 1918.

Application filed January 2, 1918. Serial No. 209,961.

*To all whom it may concern:*

Be it known that I, EDGAR D. TILLYER, a citizen of the United States, residing at Southbridge, in the county of Worcester and State of Massachusetts, have invented certain new and useful Improvements in Mirrors, of which the following is a specification.

This invention relates to new and useful improvements in mirrors and more particularly to a mirror having a reflective substance upon one face thereof which is harder than the glass composing the mirror, the main object of the present invention being the provision of a mirror wherein silicon is cathodically deposited upon one face of the glass for providing a reflective surface in place of the usual coating of silver or the like which is used at the present time.

Another object of the present invention is the provision of a mirror that can be easily sterilized without injuring the reflective surface and wherein the reflective surface is adhered to the glass in such a manner that it cannot be easily removed.

A further object of the present invention is the provision of a mirror which includes a deposit of silicon on one face of the glass providing a reflective surface which is harder than the glass itself, thus eliminating any marking or scratching of the reflective surface and wherein the reflective power is equal to the reflective power of a pure silver coating.

A still further object of this invention is the provision of a mirror having means whereby a handle can be detachably connected thereto so that the handle can be removed to permit the mirror itself to be readily sterilized.

With the above and other objects in view the invention consists in the novel features of construction and the combination and arrangement of parts hereinafter more fully set forth, pointed out in the claims and shown in the accompanying drawings, in which Figure I is a detailed perspective view constructed in accordance with my invention:

Fig. II is a transverse sectional view:

Fig. III is a transverse sectional view illustrating a slightly modified form of the invention:

Fig. IV is a transverse sectional view illustrating still another form of the invention, and Fig. V is a diagrammatic view illustrating the manner in which the silicon is deposited on the glass.

In the drawings accompanying this application I have illustrated the manner of constructing my improved mirror which includes the electric deposition of silicon on glass and in carrying this out I provide a casing and arranged in this casing upon the lower end of a support is the silicon 2 which is connected by the support to an electric wire 3 having connection with any source of electrical supply. Arranged in the bottom of the casing is a metal plate 4 arranged in spaced relation with the glass 5 and connected with a suitable source of electrical supply through the wire 6. Thus as an electric current is supplied to the silicon and the metallic plate 4, the current from the plate 4 will pass upwardly to the glass 5, the glass acting as a non-conductor so that the current will tend to draw the particles from the piece of silicon 2 onto the glass 5. After a sufficient amount of silicon deposits has been drawn onto the glass 5 the electric current is cut off and a new glass arranged in position.

In Fig. I, I have illustrated a perspective view of a mirror constructed in accordance with my invention and in the present instance it will be noted that I have illustrated herein a dental mirror including an annular band 7 interiorly grooved to receive the edges of the mirror, the mirror in the present instance including the glass 8 and the silicon deposit 9. Connected with the annular band 7 is a suitable handle 6 which may be formed integrally with the band detachably connected thereto as desired.

In Fig. III, I have illustrated a slightly modified form of the invention wherein a wire or rod 10 is embedded at one end within the glass as illustrated and is provided with an enlarged end portion 11 to prevent the withdrawal of the same from the glass. The end of the rod or wire 10 which projects beyond the edge of the mirror is threaded as illustrated at 12 and detachably connected therewith is a handle 6' which can be easily removed when it is desired to cleanse or sterilize the mirror.

In Fig. IV, I have illustrated still another form of the invention wherein the edge of the mirror is provided with an annular groove 13 in which the wire 14 is arranged, the ends of said wire being brought together at one side of the mirror and the exterior thereof threaded as illustrated at 15 whereby the handle 6' may be readily engaged therewith, and from this it will be apparent that the handle member 6' and the wire frame 14 can be quickly and readily removed from the mirror for cleansing or sterilizing the mirror. From the above it will be readily apparent that I have constructed a new and improved mirror which may be mounted in any suitable manner and used as a dental mirror or for any other suitable purpose and which is formed in such a manner that the same may be readily sterilized or cleansed in any manner without injuring the reflective surface. Furthermore, it will be noted that by having silicon cathodically deposited upon the glass by electric deposition it will eliminate any marking or scratching of the reflective surface as the silicon is harder than the glass itself.

I claim:

1. A mirror including a transparent member having a reflective silicon film formed on one face thereof.

2. A transparent body member having a reflecting surface of silicon formed thereon by electric deposition.

3. A transparent body member having a coating of silicon formed upon one face thereof by electric deposition and a handle member detachably connected with the body member as and for the purpose set forth.

4. A transparent member having a reflective silicon film formed on one face thereof, a supporting member engaged therewith and a handle detachably connected with the supporting member.

In testimony whereof I have affixed my signature, in presence of two witnesses.

EDGAR D. TILLYER.

Witnesses:
HARRY H. STYLL,
H. K. PARSONS.